US012528118B2

(12) United States Patent
Ishida

(10) Patent No.: US 12,528,118 B2
(45) Date of Patent: Jan. 20, 2026

(54) SOFT MAGNETIC POWDER AND METHOD FOR MANUFACTURING THE SAME, COIL COMPONENT INCLUDING SOFT MAGNETIC POWDER, AND METHOD FOR MANUFACTURING MAGNETIC MATERIAL INCLUDING SOFT MAGNETIC POWDER

(71) Applicant: Murata Manufacturing Co., Ltd., Kyoto-fu (JP)

(72) Inventor: Yuya Ishida, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/640,376

(22) Filed: Apr. 19, 2024

(65) Prior Publication Data

US 2024/0278318 A1 Aug. 22, 2024

Related U.S. Application Data

(60) Division of application No. 17/581,676, filed on Jan. 21, 2022, now abandoned, which is a continuation of application No. PCT/JP2020/028927, filed on Jul. 28, 2020.

(30) Foreign Application Priority Data

Jul. 29, 2019 (JP) ................................ 2019-139065

(51) Int. Cl.
*B22F 3/00* (2021.01)
*B22F 1/102* (2022.01)
(Continued)

(52) U.S. Cl.
CPC ................ *B22F 3/00* (2013.01); *B22F 1/102* (2022.01); *B22F 1/16* (2022.01); *H01F 1/1535* (2013.01); *H01F 1/22* (2013.01)

(58) Field of Classification Search
CPC .... B22F 3/00; B22F 1/102; B22F 1/16; B22F 9/00; H01F 1/1535; H01F 1/22;
(Continued)

(56) References Cited

U.S. PATENT DOCUMENTS

2012/0082844 A1 4/2012 Takahashi et al.
2017/0162307 A1* 6/2017 Ishida .................. C09D 133/02

FOREIGN PATENT DOCUMENTS

CN 103151134 A 6/2013
CN 103440950 A 12/2013
(Continued)

OTHER PUBLICATIONS

International Search Report issued in PCT/JP2020/028927; mailed Oct. 13, 2020.
Written Opinion of the International Searching Authority issued in PCT/JP2020/028927; mailed Oct. 13, 2020.

*Primary Examiner* — Adil A. Siddiqui
(74) *Attorney, Agent, or Firm* — Studebaker Brackett PLLC

(57) ABSTRACT

A soft magnetic powder including a core containing a soft magnetic metal material and an insulating film covering the surface of the core. The insulating film contains an insulating metal oxide and an iron component, and the iron component is embedded in the insulating film.

7 Claims, 3 Drawing Sheets

(51) Int. Cl.
*B22F 1/16* (2022.01)
*H01F 1/153* (2006.01)
*H01F 1/22* (2006.01)

(58) Field of Classification Search
CPC ........ H01F 2017/048; H01F 1/26; H01F 1/33; H01F 17/04; H01F 41/02; H01F 41/0246; H01F 1/14; H01F 5/00; H01F 41/00; H01F 41/04
See application file for complete search history.

(56) References Cited

FOREIGN PATENT DOCUMENTS

| | | | |
|---|---|---|---|
| CN | 106233401 | A | 12/2016 |
| JP | H09-125111 | A | 5/1997 |
| JP | 2006-128663 | A | 5/2006 |
| JP | 2009-185312 | A | 8/2009 |
| JP | 2011-243830 | A | 12/2011 |
| JP | 2012-094804 | A | 5/2012 |
| JP | 2013-534893 | A | 9/2013 |
| JP | 2015-153918 | A | 8/2015 |
| JP | 2018-009183 | A | 1/2018 |
| JP | 7475352 | B2 | 4/2024 |
| WO | 2016/056351 | A1 | 4/2016 |
| WO | 2018/131536 | A1 | 7/2018 |
| WO | 2019/069923 | A1 | 4/2019 |
| WO | 2021/020402 | A1 | 2/2021 |

* cited by examiner

SOFT MAGNETIC POWDER AND METHOD FOR MANUFACTURING THE SAME, COIL COMPONENT INCLUDING SOFT MAGNETIC POWDER, AND METHOD FOR MANUFACTURING MAGNETIC MATERIAL INCLUDING SOFT MAGNETIC POWDER

CROSS-REFERENCE TO RELATED APPLICATIONS

This application is a Divisional of U.S. patent application Ser. No. 17/581,676 filed on Jan. 21, 2022, which claims benefit of priority to International Patent Application No. PCT/JP2020/028927, filed Jul. 28, 2020, and to Japanese Patent Application No. 2019-139065, filed Jul. 29, 2019, the entire contents of each are incorporated herein by reference.

BACKGROUND

Technical Field

The present disclosure relates to a soft magnetic powder and a method for manufacturing the same, a coil component containing the soft magnetic powder, and a method for manufacturing a magnetic material including the soft magnetic powder.

Background Art

Magnetic materials having large electrical resistance are required as magnetic materials used for coil components and the like. For example, Japanese Unexamined Patent Application Publication No. 9-125111 describes a magnetic material powder that is formed by adding and uniformly dispersing a metal powder into a solution containing at least one type of metal alkoxide, adding distilled water to the solution, hydrolyzing the metal alkoxide, causing adsorption of hydroxides to the metal powder surface, and performing filtration, drying, and heating.

SUMMARY

A size reduction of electronic components is also required in accordance with the ongoing size reduction of electric equipment. A metal magnetic substance has excellent direct current superposition characteristics compared with ferrite and, therefore, is useful for a size reduction of an electronic component. When the metal magnetic substance is used as an electronic component such as a coil component, the surface of the metal magnetic substance may be subjected to insulation treatment for the purpose of ensuring the insulation performance and reducing magnetic loss (core loss). However, the present inventor found that when the surface of the metal magnetic substance is subjected to the insulation treatment, it is difficult to increase magnetic permeability. According to the research by the present inventor, this problem tends to be particularly considerable when high-frequency magnetic characteristics are required.

Accordingly, the present disclosure provides a soft magnetic powder having a high magnetic permeability and high electrical resistance and a method for manufacturing the same, a coil component containing the soft magnetic powder, and a method for manufacturing a magnetic material including the soft magnetic powder.

In view of the above-described issues, the present inventor performed intensive research and, as a result, found that a soft magnetic metal powder having a higher magnetic permeability and higher electrical resistance is obtained by introducing an iron component into an insulating film covering the surface of a core containing the soft magnetic metal material, thereby realizing the present disclosure.

According to an aspect of the present disclosure, a soft magnetic powder includes a core containing a soft magnetic metal material and an insulating film covering the surface of the core. The insulating film contains an insulating metal oxide and an iron component, and the iron component is embedded in the insulating film.

According to an aspect of the present disclosure, a method for manufacturing a soft magnetic powder includes the steps of obtaining a slurry by mixing a core containing a soft magnetic metal material, an iron salt, a metal alkoxide, and at least one selected from the group consisting of a water-soluble polymer and a surfactant in a solvent, and obtaining a soft magnetic powder including the core and an insulating film covering the surface of the core by drying the slurry.

According to an aspect of the present disclosure, a coil component includes a magnetic core containing the above-described soft magnetic powder and a binder, and a coil conductor.

According to an aspect of the present disclosure, a method for manufacturing a magnetic material includes the steps of obtaining a formed article by forming the above-described soft magnetic powder, and obtaining a magnetic material by heat-treating the formed article.

According to the soft magnetic powder of the present disclosure, a high magnetic permeability and high electrical resistance can be realized. In addition, according to the method for manufacturing the soft magnetic powder of the present disclosure, a soft magnetic powder having a high magnetic permeability and high electrical resistance can be produced. Further, the coil component according to the present disclosure can include a magnetic material having a high magnetic permeability and high electrical resistance. In addition, according to the method for manufacturing a magnetic material of the present disclosure, a magnetic material having a high magnetic permeability and high electrical resistance can be produced.

DETAILED DESCRIPTION

First Embodiment

Figure 1A:
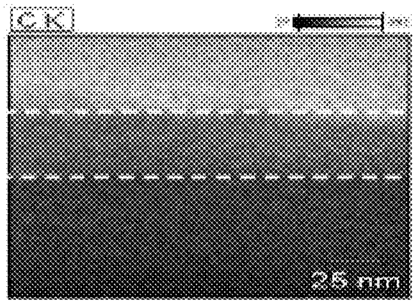
FIG. 1A illustrates a STEM-EDX analysis result (mapping result of elemental C (carbon)) of a cross section of a soft magnetic powder according to an embodiment of the present disclosure.

A soft magnetic powder according to a first embodiment of the present disclosure will be described below. The soft magnetic powder according to the present embodiment includes a core containing a soft magnetic metal material and an insulating film covering the surface of the core. In this regard, in the present specification, whether a film is an "insulating film" can be determined with reference to the volume resistivity. For example, when a high-performance resistivity meter (Hiresta (registered trademark)-UX MCP-HT800) produced by Mitsubishi Chemical Analytech Co., Ltd., is used as a powder resistance measuring instrument, the amount of the sample of a soft magnetic powder including an insulating film is set to be 10 g, and the volume resistivity measured at a load of 20 kN is $10^6$ (2 cm or more, it is determined that the film is an "insulating film". Likewise, in the present specification, "insulating" denotes that the volume resistivity is $10^6$ (2 cm or more.

(Core)

There is no particular limitation regarding the type of a soft magnetic metal material constituting the core, and the type may be appropriately selected in accordance with the use and the like. It is preferable that the core be composed of an Fe-based, a Ni-based, or a Co-based soft magnetic metal material. More specifically, the soft magnetic metal material constituting the core may be, for example, Fe, an Fe—Ni alloy, an Fe—Co alloy, an Fe—Si alloy, an Fe—Si—Cr alloy, an Fe—Si—Al alloy, or an Fe—Si—B—Cr alloy. The average particle diameter of the core is preferably 20 μm or less, more preferably 10 μm or less, and further preferably 5 μm or less. The average particle diameter of the core being set to be a small particle diameter of 20 μm or less enables a soft magnetic powder having a small particle diameter to be obtained. The soft magnetic powder having a small particle diameter enables a core loss at high frequencies to be reduced as described later. The average particle diameter of the core can be determined by obtaining a cross section of the soft magnetic powder through polishing, acquiring an electron microscope image of the resulting cross section, and analyzing the acquired image by using image analysis software.

(Insulating Film)

The insulating film covers the surface of the core. The insulating film contains an insulating metal oxide and an iron component, and the iron component is embedded in the insulating film. Herein, the insulating metal oxide and the iron component are substances that differ from each other. In this regard, "embedded" denotes that the entire surface of the iron component is placed inside the insulating film, but a portion of the iron component may be present on the surface of the insulating film. When the iron component is granular, "embedded" denotes that the entire particle surface of the iron component is covered with a component constituting the insulating film (insulating metal oxide and organic material), but a portion of the respective surface of some iron component particles may be exposed at the surface of the insulating film.

The average thickness of the insulating film is preferably 10 nm or more and 100 nm or less (i.e., from 10 nm to 100 nm) and more preferably 20 nm or more and 40 nm or less (i.e., from 20 nm to 40 nm). When the average thickness of the insulating film is 10 nm or more and more preferably 20 nm or more, the iron component which contributes to an improvement of magnetic characteristics is further readily embedded inside the insulating film. When the average thickness of the insulating film is 100 nm or less and more preferably 40 nm or less, the magnetic permeability of the soft magnetic powder can be further increased. The average thickness of the insulating film can be measured in the procedure below. Initially, the soft magnetic powder to be measured is embedded in a resin, polishing is performed, and a STEM-EDX observation sample is produced through FIB (focused ion beam) micromachining. The resulting sample is used, three fields of view per particle of the cross section of the soft magnetic powder are imaged by STEM-EDX, and the thickness of the insulating film in each EDX image is measured at four arbitrarily selected equidistant points. Three particles are subjected to the above-described measurement, and an average value determined on the basis of the thicknesses of the insulating film measured at all points (3 fields of view×4 points×3 particles=36 points) is denoted as "average thickness".

The soft magnetic powder according to the present disclosure has a higher magnetic permeability and higher electrical resistance since the surface of the core containing the soft magnetic metal material is covered with the insulating film, and the iron component which is a magnetic substance is embedded in the insulating film. In other words, according to the soft magnetic powder of the present embodiment, since the insulating film involves the iron component which is a magnetic substance, the soft magnetic powder can be provided with the insulation performance while magnetic characteristics are suppressed from deteriorating. In addition, since the surface of the core of the soft magnetic powder according to the present embodiment is covered with the insulating film, when a magnetic material is obtained by forming the soft magnetic powder according to the present embodiment, contact between cores of the soft magnetic powder is hindered, and magnetic loss of the magnetic material can be further reduced.

The above-described effects of improving the magnetic characteristics and increasing the electrical resistance are particularly useful in applications in which high-frequency magnetic characteristics are required. Inductors in which core loss due to high-frequency switching is reduced are required in accordance with the ongoing increase in frequency of the switching frequency of DC/DC converters and the like. Using a soft magnetic powder having a small particle diameter as the magnetic material enables core loss at high frequencies to be reduced. However, the magnetic permeability of the soft magnetic powder tends to be reduced with decreased particle diameter. Consequently, it is difficult to ensure compatibility between a reduction in the core loss and a high magnetic permeability. On the other hand, the soft magnetic powder according to the present disclosure can realize a higher magnetic permeability even when the particle diameter of the soft magnetic powder is small since the insulating film covering the surface of the core containing the soft magnetic metal material contains the iron component having magnetism.

Figure 1B:
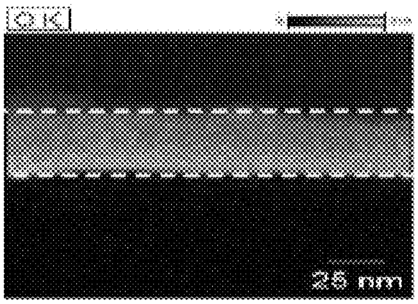
FIG. 1B illustrates a STEM-EDX analysis result (mapping result of elemental O (oxygen)) of a cross section of a soft magnetic powder according to an embodiment of the present disclosure.
Figure 1C:
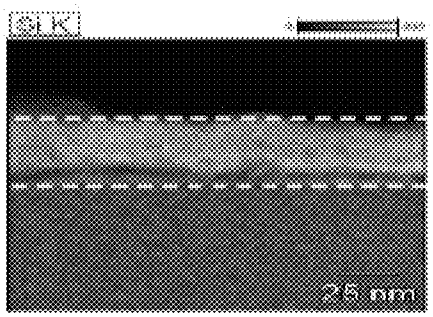
FIG. 1C illustrates a STEM-EDX analysis result (mapping result of elemental Si (silicon)) of a cross section of a soft magnetic powder according to an embodiment of the present disclosure.
Figure 1D:
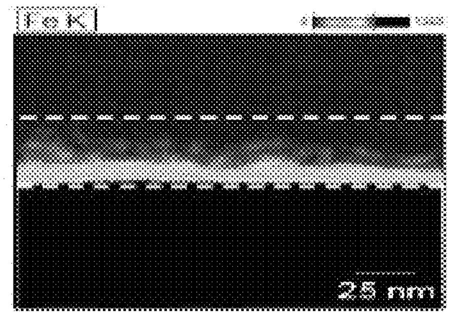
FIG. 1D illustrates a STEM-EDX analysis result (mapping result of elemental Fe (iron)) of a cross section of a soft magnetic powder according to an embodiment of the present disclosure.

Whether the iron component is embedded in the insulating film can be examined by using STEM-EDX (scanning transmission electron microscope-energy dispersive X-ray spectroscopy) in the procedure described below. Initially, the soft magnetic powder to be measured is embedded in a resin, polishing is performed, and a STEM-EDX observation sample is produced through FIB micromachining. The resulting sample is used, and electron mapping of the cross section of the insulating film is performed by using a STEM-EDX apparatus. FIG. 1A to FIG. 1D illustrate examples of the electron mapping result. An FeSi alloy in which Fe:Si=93.5:6.5 (weight ratio) was used as the core. FIG. 1A illustrates the mapping result of elemental C (carbon), FIG. 1B illustrates the mapping result of elemental O (oxygen), FIG. 1C illustrates the mapping result of elemental Si (silicon), and FIG. 1D illustrates the mapping result of elemental Fe (iron). The electron mapping results in FIG. 1A to FIG. 1D indicate that the region between two broken lines in the drawing is the insulating film and that the region under the insulating film is the core. FIG. 1D clarifies that an iron component is present in the insulating film. When the elemental iron is detected in the insulating film as illustrated in FIG. 1D, it can be said that the iron component is embedded in the insulating film. In this regard, as illustrated in FIG. 1D and illustrated in FIG. 2A and FIG. 2B described later, the amount of the iron component distributed in the vicinity of the surface of the insulating film may be larger than that in the vicinity of the core. When the iron component in the insulating film of a soft magnetic powder contained in an electronic component is analyzed, whether the iron component is embedded can be examined by performing the above-described analysis of the cross section of the electronic component. In FIG. 1B and FIG. 1C, the elemental silicon and the elemental oxygen are detected at substantially the same position. Therefore, it can be ascertained that the insulating film contains a silicon oxide as an insulating metal oxide.

After the insulating film is formed, it is possible to cause the iron component to be present on the surface of the insulating film by separately providing the iron component to the surface of the insulating film. However, it is preferable that the iron component not be present on the surface of the insulating film. That is, it is preferable that only the component other than the iron component (for example, only an insulating metal oxide and an organic material) be present on the surface of the insulating film. If the iron component is present on the surface of the insulating film, there is a concern that the electrical resistance of the soft magnetic powder may be reduced, and there is a concern that the moisture resistance may deteriorate. Whether an iron component is present on the surface of the insulating film can be examined by using XPS (X-ray photoelectron spectroscopy). When a peak attributed to Fe is not detected by the XPS analysis of the insulating film, it can be determined that an iron component is not present on the surface of the insulating film.

The iron component is a component containing elemental iron. The iron component is preferably an oxide containing iron and more preferably iron oxide. In such an instance, there is no particular limitation regarding the composition of the iron oxide (oxidation number of iron). The iron component may be an oxide having magnetism, such as maghemite, hematite, and magnetite. Since iron oxide has a higher resistivity than iron metal, when the iron component is iron oxide, the insulation performance of the insulating film may be further improved. Whether the iron component is iron oxide can be examined on the basis of the above-described element mapping. When elemental iron and elemental oxygen are detected at substantially the same position as illustrated in FIG. 1B and FIG. 1D, it is conjectured that the iron component is iron oxide.

Figure 2A:
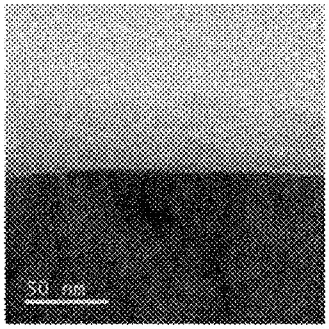
FIG. 2A illustrates a TEM image of a cross section of a soft magnetic powder according to a first embodiment of the present disclosure.
Figure 2B:
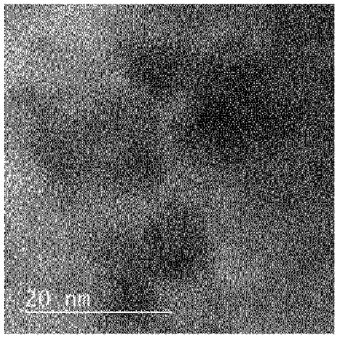
FIG. 2B illustrates a TEM image of a cross section of a soft magnetic powder according to the first embodiment of the present disclosure.

The insulating film preferably includes particles of the iron component. In other words, in the insulating film, the iron component is present preferably in the form of a particle. The entire surface of the particle of the iron component is covered with a component (an insulating metal oxide and an organic material) constituting the insulating film, and the particles are present in the insulating film while being dispersed. Whether the iron component is present in the form of a particle can be examined on the basis of the above-described element mapping and a transmission electron microscope (TEM) image of a cross section of the insulating film. Examples of the TEM image of a cross section of the insulating film are illustrated in FIG. 2A and FIG. 2B. As illustrated in FIG. 2B, in the TEM image, a region in which a check pattern is observed corresponds to the particle of the iron component. The check pattern in the TEM image indicates presence of a crystalloid.

The average particle diameter of the particles of the iron component is preferably 5 nm or more and 20 nm or less (i.e., from 5 nm to 20 nm). The average particle diameter being 5 nm or more enables the relative magnetic permeability of the soft magnetic powder to be increased. The average particle diameter being 20 nm or less enables the particle of the iron component to be smaller than the size of a magnetic domain and enables magnetic loss to be further reduced. That is, the insulating film preferably contains a nanoparticle (a crystal having a particle diameter on the order of nanometers) of the iron component. The average particle diameter of particles of the iron component can be determined in the procedure described below on the basis of the TEM image. In the TEM image, the major axis (the longest diameter) and the minor axis (the shortest diameter) of each of 10 particles of the iron component are measured, and the average value of the major axis and the minor axis is specified to be the particle diameter of the particle. The average value of the thus determined particle diameters of the 10 particles is defined as an average particle diameter.

The content of the iron component in the insulating film is, for example, 0.3% by weight or more and 5% by weight or less (i.e., from 0.3% by weight to 5% by weight) and preferably 0.5% by weight or more and 3% by weight or less (i.e., from 0.5% by weight to 3% by weight) when the content is calculated from the ratio of the weight of Fe in the insulating film to the weight of the core. The content of the iron component being 0.5% by weight or more enables the magnetic permeability of the soft magnetic powder to be further increased. The content of the iron component being 3% by weight or less enables the electrical resistance to be further increased. The content of the iron component in the insulating film can be estimated from the amount of the iron salt charged as the raw material for the iron component.

The insulating metal oxide constituting the insulating film is preferably a hydrolysis product of a metal alkoxide. The insulating film may contain an organic material, as described later. The insulating film in which the insulating metal oxide having a high melting point and the organic material having a low melting point are hybridized can be formed by exploiting a hydrolysis reaction of a metal alkoxide that can generate an insulating metal oxide through a low-temperature process. The metal alkoxide will be described later in detail. The insulating metal oxide is preferably at least one selected from the group consisting of titanium oxide, silicon oxide, aluminum oxide, and zirconium oxide. In addition, the insulating metal oxide is preferably amorphous.

The insulating film preferably further contains an organic material. The organic material is preferably at least one selected from the group consisting of a water-soluble polymer and a surfactant. The water-soluble polymer and the surfactant have a function of assisting introduction of the iron component into the insulating film during formation of the insulating film on the surface of the core, as described later. The water-soluble polymer and the surfactant will be described later in detail.

The insulating film preferably contains at least one element selected from the group consisting of C, N, and P. These elements are derived from the water-soluble polymer and/or the surfactant.

In the insulating film, the insulating metal oxide and the organic material (water-soluble polymer and/or surfactant) are present in a state of being hybridized (state of being homogenously mixed at a molecular level). Whether the insulating metal oxide and the organic material are hybridized and constituent elements of the organic material can be examined on the basis of a peak shift of a OH group in the IR spectrum obtained by analyzing the insulating film by using a Fourier transform infrared spectrophotometer (FT-IR). The constituent elements of the organic material can also be examined on the basis of organic components detected by analyzing the soft magnetic powder by using gas chromatography mass spectrometry (GC-MS).

Part of the core may be exposed at the surface of the soft magnetic powder without being covered with the insulating film, but it is preferable that the entire surface of the core be covered with the insulating film. The average coverage of the soft magnetic powder by the insulating film is preferably 90% or more, more preferably 95% or more, further preferably 99% or more, and particularly preferably 100%.

(Method for Manufacturing Soft Magnetic Powder)

Next, the method for manufacturing the soft magnetic powder according to the first embodiment will be described. The method for manufacturing the soft magnetic powder according to the first embodiment includes the steps of obtaining a slurry by mixing a core containing a soft magnetic metal material, an iron salt, a metal alkoxide, and at least one selected from the group consisting of a water-soluble polymer and a surfactant in a solvent, and obtaining a soft magnetic powder including the core and an insulating film covering the surface of the core by drying the slurry.

(Preparation of Slurry)

Initially, the slurry is obtained by mixing the core containing the soft magnetic metal material, the iron salt, the metal alkoxide, and at least one selected from the group consisting of the water-soluble polymer and the surfactant in the solvent.

The type and the average particle diameter of the soft magnetic metal material constituting the core are as described above. In this regard, it can be considered that the average particle diameter of the core serving as a raw material is substantially equal to the average particle diameter of the core in the resulting soft magnetic powder. The average particle diameter of the core serving as the raw material can be measured by using a laser-diffraction-type particle diameter distribution measuring apparatus or the like. In this regard, the average particle diameter of the core serving as the raw material can be expressed as a median diameter on a volume basis.

(Iron Salt)

The iron salt serves as a raw material for the iron component contained in the insulating film. The iron salt may be selected from any iron salts, for example, inorganic salts, such as iron chloride, iron sulfate, iron nitrate, iron phosphate, and iron nitrite and hydrates thereof, organic salts, such as iron oxalate, iron acetate, iron succinate, and iron malate, and complex salts. When alcohol is used as a solvent, the iron salt is preferably soluble in alcohol. Specifically, the iron salt is at least one selected from the group consisting of iron chloride and iron nitrate and hydrates thereof. Regarding the iron salt, the iron salts may be used alone, or at least two types of iron salts may be used in combination. It is preferable that the iron salt be added at a proportion of 0.1% by weight or more and 20% by weight or less (i.e., from 0.1% by weight to 20% by weight) relative to the weight of the core.

(Metal Alkoxide)

The metal alkoxide serves as a raw material for the insulating metal oxide contained in the insulating film. The insulating film containing the insulating metal oxide is formed on the surface of the core due to hydrolysis of the metal alkoxide in the slurry. The insulating film in which the insulating metal oxide and the organic material (water-soluble polymer and/or surfactant) are hybridized can be formed by exploiting a hydrolysis reaction of the metal alkoxide.

The metal alkoxide is denoted by a chemical formula $M(OR)_x$ (M: metal element, OR: alkoxy group). The metal species M constituting the metal alkoxide may be at least one selected from the group consisting of Li, Na, Mg, Al, Si, K, Ca, Ti, Cu, Sr, Y, Zr, Ba, Ce, Ta, and Bi. Of these, the metal alkoxide is preferably an alkoxide of at least one selected from the group consisting of Si, Ti, Al, and Zr and more preferably of Si. The metal alkoxide being an alkoxide of at least one selected from the group consisting of Si, Ti, Al, and Zr enables the insulating metal oxide having higher strength and higher specific resistance to be formed. Further, when the metal species M is Si, a metal alkoxide ($Si(OR)_4$) is chemically more stable and, therefore, is further readily handled during production.

There is no particular limitation regarding the alkoxy group OR constituting the metal alkoxide, and the alkoxy group may have a carbon number of, for example, 10 or less, particularly 5 or less, and further particularly 3 or less. The hydrolysis reaction can further readily proceed with reduced carbon number. The alkoxy group is preferably at least one selected from the group consisting of, for example, a methoxy group, an ethoxy group, and a propoxy group. Specifically, the metal alkoxide is preferably at least one selected from the group consisting of tetraethyl orthosilicate, titanium tetraisopropoxide, zirconium-n-butoxide, and aluminum isopropoxide.

In the manufacturing method according to the present embodiment, one type of metal alkoxide may be used alone, or at least two types of metal alkoxides may be used in combination. It is preferable that the metal alkoxide be added at a proportion of 0.1% by weight or more and 5% by weight or less (i.e., from 0.1% by weight to 5% by weight) in terms of the resulting insulating metal oxide relative to the weight of the core.

(Water-Soluble Polymer and Surfactant)

The water-soluble polymer and the surfactant have a function of assisting introduction of the iron component into the insulating film. The water-soluble polymer and the surfactant have a ligand capable of forming a complex with an Fe ion and a proton-accepting group and/or a proton-donating group which can form a hydrogen bond with a hydrolysis product of the metal alkoxide. Consequently, since the water-soluble polymer and/or the surfactant coordination-bonded to a Fe ion forms a hydrogen bond with a hydrolysis product of the metal alkoxide, the iron component is taken into the insulating film. Regarding the ligand capable of forming a complex with an Fe ion, for example, a compound having a functional group or the like that includes a lone electron pair capable of donating an electron to a vacant d-orbital of the Fe ion can be used.

The water-soluble polymer may be any one of anionic, cationic, and nonionic, and at least one selected from the group consisting of, for example, polyethyleneimines, polyvinylpyrrolidones, polyethylene glycols, polyacrylic acids, carboxymethyl celluloses, hydroxypropyl celluloses, polyacrylamides, poly(2-methyl-2-oxazoline)s, polyvinyl alcohols, and gelatin can be used. Of these, the water-soluble polymer is preferably at least one selected from the group consisting of polyvinylpyrrolidones, polyvinyl alcohols, hydroxypropyl celluloses, poly(2-methyl-2-oxazoline)s, polyethyleneimines, polyacrylic acids, and carboxymethyl celluloses.

The surfactant may be any one of anionic, cationic, nonionic, and amphoteric, and at least one selected from the group consisting of, for example, fatty acid salts, α-sulfo fatty acid ester salts, alkylbenzenesulfonic acid salts, alkylsulfuric acid salts, alkyl ether sulfuric acid ester salts, alkylsulfuric acid triethanolamines, fatty acid diethanolamides, polyoxyethylene alkyl ethers, polyoxyethylene alkyl phenyl ethers, alkyltrimethylammonium salts, dialkyldimethylammonium chlorides, alkylpyridinium chlorides, and alkylcarboxybetaines can be used. Of these, the surfactant is preferably at least one selected from the group consisting of polyoxyalkylene styryl phenyl ether sodium phosphate, hexadecyltrimethylammonium bromide, and lauric acid diethanolamide.

Regarding the organic material that forms a complex with an Fe ion, one type of water-soluble polymer may be used alone, or at least two types of water-soluble polymers may be used in combination. Alternatively, regarding the organic material that forms a complex with an Fe ion, one type of surfactant may be used alone, or at least two types of surfactants may be used in combination. Alternatively, regarding the organic material that forms a complex with an Fe ion, at least one type of water-soluble polymer and at least one type of surfactant may be used in combination. The organic material that forms a complex with an Fe ion is added preferably at a proportion of 0.1% by weight or more and 1% by weight or less (i.e., from 0.1% by weight to 1% by weight) relative to the weight of the core.

(Solvent)

Regarding the solvent, solvents commonly used for a sol-gel method can be appropriately used. The solvent preferably contains alcohol. When the solvent contains alcohol, for example, methanol or ethanol can be used for the alcohol.

(Catalyst)

To accelerate the hydrolysis rate of the metal alkoxide, a catalyst may be added, as the situation demands. Regarding the catalyst, for example, acidic catalysts, such as hydrochloric acid, acetic acid, and phosphoric acid, basic catalysts, such as ammonia, sodium hydroxide, and piperidine, and salt catalysts, such as ammonium carbonate and ammonium acetate, can be used. Of these, ammonia is preferable because of having low reactivity with the core and not affecting the resistance value of the insulating film even when remaining in the insulating film.

A slurry is obtained by mixing the above-described raw materials. The slurry being obtained as described above may include the metal alkoxide being hydrolyzed. Mixing may be performed at room temperature but may be performed while heating is performed. The resulting slurry may be subjected to treatment such as filtration and/or washing before drying described later. Filtration may be performed by using, for example, a pressure filter such as a filter press, a vacuum filter such as Nutsche, and a centrifugal filter. Washing may be performed by using, for example, acetone.

(Drying)

Subsequently, the slurry is dried so as to obtain the soft magnetic powder including the core and the insulating film covering the surface of the core. Drying may be performed at room temperature but may be performed while heating is performed.

According to the above-described method, an insulating film containing the insulating metal oxide and the iron component, where the iron component is embedded in the insulating film, can be formed as the insulating film. The soft magnetic powder obtained by using the above-described method includes such an insulating film and, therefore, has a higher magnetic permeability and higher electrical resistance.

The insulating metal oxide is preferably an oxide of at least one selected from the group consisting of Si, Al, Ti, and Zr. The insulating metal oxide being an oxide of at least one selected from the group consisting of Si, Al, Ti, and Zr enables the strength and the specific resistance of the insulating film to be further improved.

Second Embodiment

Next, a magnetic material and a coil component according to the second embodiment of the present disclosure will be described below.

The magnetic material according to the present embodiment contains the soft magnetic powder according to the present embodiment of the present disclosure and the binder. Regarding the binder, at least one selected from the group consisting of thermosetting resins, such as epoxy resins, phenol resins, and silicone resins, and low-melting point glass can be used. The magnetic material according to the present embodiment can be produced by adding the binder to the soft magnetic powder, performing forming into a predetermined shape, and performing heating, as the situation demands, so as to cause curing. Forming can be performed by, for example, using a mold or introducing into an injection portion. The heating temperature can be appropriately set in accordance with the curing temperature of the binder used. For example, when an epoxy resin is used as the binder, the epoxy resin can be cured by performing heating at a temperature of 150° C. or higher and 200° C. or lower. The magnetic material according to the present embodiment has a higher magnetic permeability and higher electrical resistance.

Figure 3:
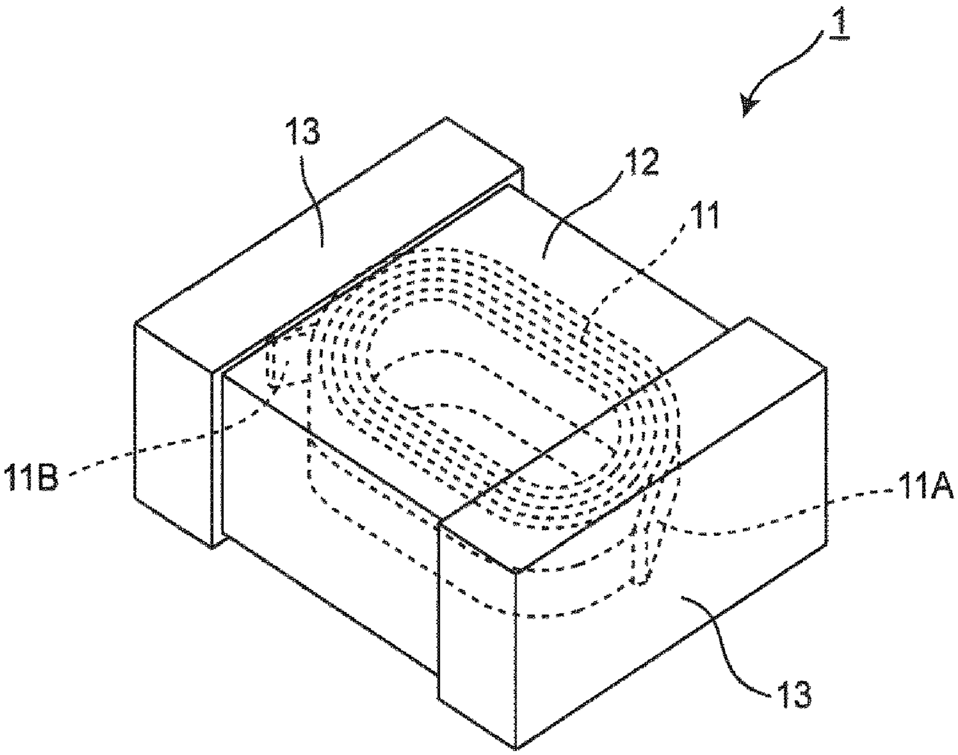
FIG. 3 is a schematic diagram illustrating a coil component according to a second embodiment of the present disclosure.

FIG. 3 is a schematic diagram illustrating a coil component according to the second embodiment. A coil component 1 illustrated in FIG. 3 includes a magnetic core 12 containing the soft magnetic powder according to the embodiment of the present disclosure and the binder and a coil conductor 11. The magnetic core 12 contains the magnetic material containing the soft magnetic powder according to the present embodiment of the present disclosure and the binder. The coil conductor 11 is a conductor formed into the shape of a coil and may be, for example, a conducting wire wound into the shape of an α-winding coil. For example, a copper wire, a silver wire, or the like can be used as the conducting wire. Alternatively, the coil conductor 11 may be formed by coating a substrate with a conductor paste so as to have the shape of a coil. Alternatively, the coil conductor 11 may be formed by patterning a metal film into the shape of a coil on a substrate through etching or the like. In the coil component 1 according to the present embodiment, the coil conductor 11 may be arranged in the magnetic core 12 as illustrated in FIG. 3, but the coil conductor 11 may be wound around the magnetic core 12. The coil component 1 according to the present embodiment has a higher magnetic permeability and higher electrical resistance.

In the coil component 1 illustrated in FIG. 3, the coil conductor 11 is embedded in the magnetic core (element assembly) 12 containing the soft magnetic powder and the binder. Winding ends 11A and 11B of the coil conductor 11 are electrically coupled to the respective terminal electrodes 13 formed on the respective end portions of the magnetic core 12. The terminal electrode 13 may be formed by, for example, coating a magnetic core with a conductor paste such as a Ag paste or a Cu paste. Alternatively, the terminal electrode 13 may be formed by Ni sputtering, Ti sputtering, NiCr sputtering, or the like. Alternatively, for example, a cap-shaped metal conductor can be used as the terminal electrode 13. In such an instance, the cap-shaped metal conductor (terminal electrode) 13 is fit on each end portion of the element assembly 12, and coupling and fixing between the terminal electrode 13 and the element assembly 12 and between the terminal electrode 13 and the winding ends 11A and 11B can be performed by using a conductive adhesive or the like. The terminal electrode 13 may be a single layer or be produced by stacking a plurality of layers.

An example of the method for manufacturing the coil component 1 according to the present embodiment will be described below. Initially, a mixture is obtained by mixing the soft magnetic powder and the binder. The resulting mixture is formed into the shape of a sheet so as to obtain a magnetic sheet. The coil conductor 11 is embedded in the resulting magnetic sheet. Thereafter, cutting into a predetermined dimension is performed, and the binder is cured by heating to a predetermined temperature so as to obtain the magnetic core 12 in which the coil conductor 11 is disposed. The coil component 1 can be obtained by forming the terminal electrodes 13 on the resulting magnetic core 12. As another method, the magnetic core 12 in which the coil conductor 11 is disposed can also be produced by a method below. Initially, a coil conductor pattern is formed on a magnetic sheet obtained by forming a mixture of a coil soft magnetic powder and a binder. A predetermined number of the magnetic sheets provided with the coil conductor pattern are stacked so as to obtain a multilayer body. The multilayer body is cut into a predetermined dimension. Thereafter, the binder is cured by heating to a predetermined temperature so as to obtain the magnetic core 12 in which the coil conductor 11 is disposed. The coil component 1 can be obtained by forming the terminal electrodes 13 on the resulting magnetic core 12.

Third Embodiment

Next, a magnetic material and a coil component according to the third embodiment of the present disclosure will be described below.

A method for manufacturing the magnetic material according to the present embodiment includes the steps of obtaining a formed article by forming the soft magnetic powder according to the embodiment of the present disclosure and obtaining a magnetic material by heat-treating the formed article. Initially, a magnetic paste is obtained by adding a binder such as PVA (polyvinyl alcohol) to the soft magnetic powder and performing mixing. A formed article can be obtained by forming the resulting magnetic paste by using a doctor blade method or the like. The magnetic material can be obtained by heat-treating (firing) the resulting formed article in the air atmosphere at a predetermined temperature. The heat-treatment temperature is preferably, for example, about 200° C. or higher and 850° C. or lower. Regarding cores in the magnetic material according to the present embodiment, it is preferable that oxide films covering the respective core surfaces be bonded to each other. The thus obtained magnetic material has a higher magnetic permeability and higher electrical resistance.

Figure 4A:
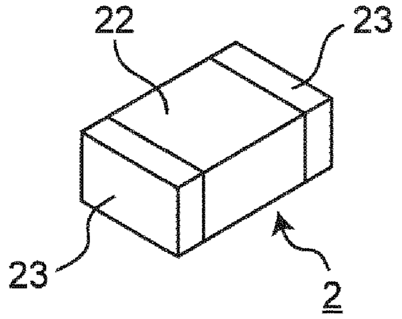
FIG. 4A is a schematic perspective view illustrating a coil component according to a third embodiment of the present disclosure.
Figure 4B:
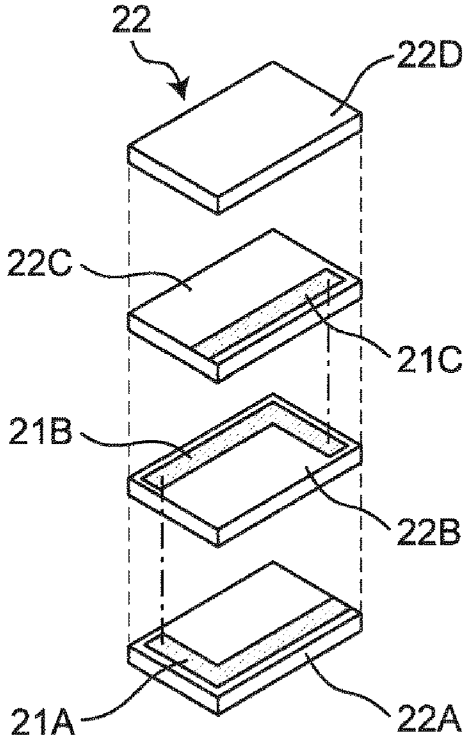
FIG. 4B is a schematic exploded perspective view illustrating an element assembly constituting the coil component according to the third embodiment of the present disclosure.

FIG. 4A and FIG. 4B illustrate an example of a coil component containing the magnetic material according to the present disclosure. FIG. 4A is a perspective view of a coil component 2, and FIG. 4B is an exploded perspective view of an element assembly 22 constituting the coil component 2. The coil component 2 illustrated in FIG. 4A includes the element assembly 22 and a coil conductor disposed inside the element assembly 22. The element assembly 22 contains the magnetic material produced by using the soft magnetic powder according to the embodiment of the present disclosure. As illustrated in FIG. 4B, the coil conductor may be composed of coil conductor patterns 21A to 21C, and the element assembly 22 may be composed of magnetic layers 22A to 22D. The coil component 2 may further include terminal electrodes 23. The coil component 2 according to the present embodiment has a higher magnetic permeability and higher electrical resistance.

An example of the method for manufacturing the coil component 2 according to the present embodiment will be described below. Initially, a magnetic paste for forming the magnetic layers 22A to 22D is obtained by adding a binder such as PVA or the like to the soft magnetic powder and performing mixing. In addition, a conductive paste such as a Ag paste for forming the coil conductor patterns 21A to 21C is separately prepared. The magnetic paste and the conductor paste are alternately applied in a layered manner so as to obtain a formed article. The resulting formed article is subjected to binder removal treatment in air at a predetermined temperature and, thereafter, to heat treatment at a predetermined temperature so as to obtain the element assembly 22. The terminal electrode 23 is formed at both ends of the resulting element assembly 22. The terminal electrode 23 can be formed by, for example, coating both ends of the element assembly 22 with a conductor paste such as a Ag paste for the terminal electrode 13, performing baking treatment, and, thereafter, performing plating.

EXAMPLES

Example 1

A soft magnetic powder of example 1 was produced in the procedure described below. In example 1, an FeSi alloy powder (Fe:Si=93.5:6.5 (weight ratio)) which was produced by a water atomization method and which had an average particle diameter (median diameter on a volume basis) of 5 μm was used as the core, iron chloride tetrahydrate was used as the iron salt, tetraethyl orthosilicate was used as the metal alkoxide, polyvinylpyrrolidone K30 was used as the water-soluble polymer, ethanol was used as the solvent, and ammonia was used as the basic catalyst. Addition of 10 g of 9%-by-weight ammonia aqueous solution and 50 g of FeSi alloy powder to 14.2 g of ethanol was performed. A liquid mixture was obtained by adding 0.5% by weight of polyvinylpyrrolidone K30 relative to the weight of the FeSi alloy powder and 3.5% by weight of iron chloride tetrahydrate relative to the weight of the FeSi alloy powder to ethanol mixed with the ammonia aqueous solution and the FeSi alloy powder and performing agitation. Tetraethyl orthosilicate was weighed in an amount of 3% by weight in terms of $SiO_2$ relative to the weight of the FeSi alloy powder and was dripped to the liquid mixture. A slurry was obtained by agitating and mixing the liquid mixture after dripping for 60 minutes. The resulting slurry was filtered, washed with acetone, and, thereafter, dried at 60° C. so as to obtain a soft magnetic powder of example 1. Iron was hardly detected in the filtrate after filtration and in the washing liquid after washing.

Example 2

A soft magnetic powder of example 2 was prepared in the procedure akin to the procedure in example 1 except that polyvinylpyrrolidone K30 added was set to be 0.25% by weight relative to the weight of the FeSi alloy powder (Fe:Si=93.5:6.5 (weight ratio)).

Example 3

A soft magnetic powder of example 3 was prepared in the procedure akin to the procedure in example 1 except that iron chloride tetrahydrate added was set to be 1.7% by weight relative to the weight of the FeSi alloy powder.

Examples 4 to 6

Soft magnetic powders of examples 4 to 6 were prepared in the procedure akin to the procedure in example 1 except that titanium tetraisopropoxide, zirconium-n-butoxide, and aluminum isopropoxide, respectively, were used instead of tetraethyl orthosilicate as the metal alkoxide.

Examples 7 to 12

Soft magnetic powders of examples 7 to 12 were prepared in the procedure akin to the procedure in example 1 except that a polyvinyl alcohol, a hydroxypropyl cellulose, a poly(2-methyl-2-oxazoline), a polyoxyalkylene styryl phenyl ether sodium phosphate, hexadecyltrimethylammonium bromide, and lauric acid diethanolamide, respectively, were used instead of polyvinylpyrrolidone K30.

Example 13

A soft magnetic powder of example 13 was prepared in the procedure akin to the procedure in example 1 except that iron chloride tetrahydrate as the iron salt was changed to iron nitrate nonahydrate.

Comparative Example 1

A soft magnetic powder of comparative example 1 was prepared in the procedure akin to the procedure in example 1 except that the water-soluble polymer was not added.

Comparative Example 2

A soft magnetic powder of comparative example 2 was prepared in the procedure akin to the procedure in example 1 except that the iron salt was not added.

Comparative Example 3

A soft magnetic powder of comparative example 3 was prepared in the procedure akin to the procedure in example 1 except that the metal alkoxide was not added.

(Analysis of Iron Component)

Regarding the soft magnetic powder of each of examples 1 to 13 and comparative examples 1 to 3, the average particle diameter of the iron component present in the insulating film and presence or absence of the iron component on the insulating film surface were measured in the procedures described below. Initially, the soft magnetic powder to be measured was embedded in a resin, polishing was performed, and a STEM-EDX observation sample was produced through FIB (focused ion beam) micromachining. The resulting sample was used, and electron mapping of the cross section of the insulating film was performed by using a STEM-EDX apparatus. JEM-2000FS produced by JEOL LTD., was used for STEM, and NORAN System 7 was used for an EDX apparatus. As a result of electron mapping, regarding the soft magnetic powders of examples 1 to 13, it was ascertained that the iron component was embedded in the insulating film. The electron mapping result of example 1 is illustrated in FIG. 1A to FIG. 1D as a typical example. Since the elemental iron and the elemental oxygen are detected at substantially the same position as illustrated in FIG. 1B and FIG. 1D, it is estimated that the iron component is iron oxide. On the other hand, regarding the soft magnetic powders of comparative examples 1 to 3, the iron component embedded in the insulating film was not observed. In FIG. 1A, a C (carbon) element derived from the organic material was detected in the insulating film. In addition, in FIG. 1D, an oxide film containing iron was detected in the vicinity of the interface between the insulating film and the core. It is estimated that this is derived from an oxide film formed on an FeSi alloy powder surface during production of the FeSi alloy powder (Fe:Si=93.5:6.5 (weight ratio)) serving as the core by a water atomization method.

Regarding the soft magnetic powders of examples 1 to 13 in which presence of the iron component embedded in the insulating film was ascertained, an image of a cross section of the insulating film was imaged by using TEM. FIG. 2A and FIG. 2B illustrate a TEM image of a cross section of the insulating film of example 1 as a typical example. In FIG. 2A and FIG. 2B, a check pattern corresponding to the particle of the iron component was observed. The average particle diameter of particles of the iron component embedded in the insulating film was determined in the procedure described below on the basis of the acquired TEM image. The major axis (the longest diameter) and the minor axis (the shortest diameter) of each of 10 particles of the iron component were measured, and the average value of the major axis and the minor axis was specified to be the particle diameter of the particle. The average value of the particle diameters of 5 particles was defined as an average particle diameter. The results are described in Table 1. The content of the iron component embedded in the insulating film (except the iron component on the insulating film surface) is also described in Table 1. The content (% by weight) of the iron component was calculated from the ratio of the weight of Fe in the insulating film to the weight of the core. The numerical value described in Table 1 is a value estimated from the amount of the iron salt charged as the raw material for the iron component on the assumption that the entire iron in the iron salt was taken into the insulating film. Regarding the soft magnetic powders of comparative examples 1 to 3 in which the iron component embedded in the insulating film was not observed by electron mapping of the cross section of the insulating film by using the STEM-EDX apparatus, the content of the iron component in Table 1 was assumed to be 0% by weight.

Regarding the soft magnetic powder of each of examples 1 to 13 and comparative examples 1 to 3, whether the iron component was present on the surface of the insulating film was examined by the XPS analysis. The XPS analysis was performed by using VersaProbe produced by ULVAC-PHI, Inc. As a result of the XPS analysis, when an Fe peak was detected, it was determined that the iron component was present on the surface of the insulating film, and "yes" was entered into Table 1. When an Fe peak was not detected, it was determined that the iron component was not present on the surface of the insulating film, and "none" was entered into Table 1.

(Production of Toroidal Ring)

The soft magnetic powder of each of examples 1 to 13 and comparative examples 1 to 3 was used, and a toroidal ring was produced in the procedure described below. The soft magnetic powder and 3% by weight of silicone resin relative to the weight of the soft magnetic powder were mixed so as to obtain a granulated material. The resulting granulated material was heat-formed by using a mold and solidified so as to obtain the toroidal ring.

(Measurement of Specific Resistance)

Regarding the toroidal ring produced by using the soft magnetic powder of each of examples 1 to 13 and comparative examples 1 to 3, a voltage of 10 V was applied for 5 seconds, and the specific resistance of the toroidal ring was measured. The specific resistance was measured by using a digital electrometer (Advantest R8340A ULTRA HIGH RESISTANCE METER) produced by Advantest. The results are described in Table 1.

(Measurement of Relative Magnetic Permeability)

Regarding the toroidal ring produced by using the soft magnetic powder of each of examples 1 to 13 and comparative examples 1 to 3, the relative magnetic permeability at 1 MHz was measured. The relative magnetic permeability was measured by using an impedance analyzer (Agilent E4991A RF) produced by Agilent Technologys. The results are described in Table 1.

TABLE 1

| | Average particle diameter of iron component (nm) | Content of iron component (% by weight) | Iron component on insulating film surface | Specific resistance (Ω · cm) | Relative magnetic permeability (−) |
|---|---|---|---|---|---|
| Example 1 | 10 | 1 | none | $5.00 \times 10^{12}$ | 10 |
| Example 2 | 20 | 1 | none | $4.90 \times 10^{12}$ | 11 |
| Example 3 | 5 | 0.5 | none | $3.80 \times 10^{12}$ | 9 |
| Example 4 | 10 | 1 | none | $3.20 \times 10^{12}$ | 10 |
| Example 5 | 10 | 1 | none | $4.30 \times 10^{12}$ | 10 |
| Example 6 | 10 | 1 | none | $1.50 \times 10^{12}$ | 9 |
| Example 7 | 10 | 1 | none | $1.30 \times 10^{12}$ | 10 |
| Example 8 | 10 | 1 | none | $3.40 \times 10^{12}$ | 10 |
| Example 9 | 10 | 1 | none | $3.50 \times 10^{12}$ | 10 |
| Example 10 | 10 | 1 | none | $2.80 \times 10^{12}$ | 10 |
| Example 11 | 10 | 1 | none | $9.80 \times 10^{11}$ | 10 |
| Example 12 | 10 | 1 | none | $3.20 \times 10^{12}$ | 10 |
| Example 13 | 10 | 0.5 | none | $2.80 \times 10^{12}$ | 10 |
| Comparative example 1 | — | 0 | yes | $1.30 \times 10^{10}$ | 5 |
| Comparative example 2 | — | 0 | none | $5.30 \times 10^{12}$ | 4 |
| Comparative example 3 | — | — | — | $4.50 \times 10^{4}$ | 6 |

As described in Table 1, regarding the soft magnetic powders of examples 1 to 13, nanoparticles of the iron component embedded in the insulating film were detected. Regarding the soft magnetic powders of examples 1 to 13, the component was not detected on the surface of the insulating film. On the other hand, regarding the soft magnetic powder of comparative example 1, to which neither the water-soluble polymer nor the surfactant was added, the iron component embedded in the insulating film was not detected. Regarding the soft magnetic powder of comparative example 1, the iron component on the surface of the insulating film was detected. Regarding the soft magnetic powder of comparative example 2, to which the iron salt was not added, the iron component embedded in the insulating film was not detected. Regarding the soft magnetic powder of comparative example 3, to which the metal alkoxide was not added, the iron component embedded in the insulating film was not detected. Regarding the soft magnetic powder of comparative example 1, the iron component on the surface of the insulating film was detected.

In addition, as described in Table 1, the soft magnetic powders of examples 1 to 13 exhibited a high specific resistance of $9.80 \times 10^{11}$ or more and a high relative magnetic permeability of 9 or more. On the other hand, the soft magnetic powder of comparative example 1, to which neither the water-soluble polymer nor the surfactant was added, exhibited low specific resistance and a low relative magnetic permeability compared with the soft magnetic powders of examples 1 to 13. The soft magnetic powder of comparative example 2, to which the iron salt was not added, exhibited a low relative magnetic permeability compared with the soft magnetic powders of examples 1 to 13. The soft magnetic powder of comparative example 3, to which the metal alkoxide was not added, exhibited low specific resistance and a low relative magnetic permeability compared with the soft magnetic powders of examples 1 to 13.

The present disclosure includes the following aspects but is not limited to these aspects.

(Aspect 1)

A soft magnetic powder including a core containing a soft magnetic metal material, and an insulating film covering the surface of the core. The insulating film contains an insulating metal oxide and an iron component, and the iron component is embedded in the insulating film.

(Aspect 2)

The soft magnetic powder according to aspect 1, wherein the iron component is iron oxide.

(Aspect 3)

The soft magnetic powder according to aspect 1 or aspect 2, wherein the insulating film includes particles of the iron component.

(Aspect 4)

The soft magnetic powder according to any one of aspects 1 to 3, wherein the average particle diameter of the particles of the iron component is 5 nm or more and 20 nm or less (i.e., from 5 nm to 20 nm).

(Aspect 5)

The soft magnetic powder according to any one of aspects 1 to 4, wherein the insulating metal oxide is a hydrolysis product of a metal alkoxide.

(Aspect 6)

The soft magnetic powder according to any one of aspects 1 to 5, wherein the insulating film further contains an organic material.

(Aspect 7)

The soft magnetic powder according to aspect 6, wherein the organic material is at least one selected from the group consisting of a water-soluble polymer and a surfactant.

(Aspect 8)

The soft magnetic powder according to any one of aspects 1 to 7, wherein the insulating film contains at least one element selected from the group consisting of C, N, and P.

(Aspect 9)

The soft magnetic powder according to any one of aspects 1 to 8, wherein the insulating metal oxide is at least one selected from the group consisting of titanium oxide, silicon oxide, aluminum oxide, and zirconium oxide.

(Aspect 10)

The soft magnetic powder according to any one of aspects 1 to 11, wherein the core contains an Fe-based, Ni-based, or Co-based soft magnetic metal material.

(Aspect 11)

The soft magnetic powder according to any one of aspects 1 to 10, wherein an iron component is not present on the surface of the insulating film.

(Aspect 12)

The soft magnetic powder according to any one of aspects 1 to 11, wherein a film of an oxide containing iron is further included, and the film of the oxide containing iron is disposed in the vicinity of an interface between the insulating film and the core.

(Aspect 13)

A method for manufacturing a soft magnetic powder including the steps of obtaining a slurry by mixing a core containing a soft magnetic metal material, an iron salt, a metal alkoxide, and at least one selected from the group consisting of a water-soluble polymer and a surfactant in a solvent, and obtaining a soft magnetic powder including the core and an insulating film covering the surface of the core by drying the slurry.

(Aspect 14)

The method for manufacturing a soft magnetic powder according to aspect 13, wherein the obtaining of a slurry includes hydrolyzing the metal alkoxide.

(Aspect 15)

The method for manufacturing a soft magnetic powder according to aspect 13 or aspect 14, wherein the iron salt is soluble in alcohol.

(Aspect 16)

The method for manufacturing a soft magnetic powder according to aspect 15, wherein the iron salt is at least one selected from the group consisting of iron chloride and iron nitrate and hydrates thereof.

(Aspect 17)

The method for manufacturing a soft magnetic powder according to any one of aspects 13 to 16, wherein the water-soluble polymer and the surfactant have a ligand capable of forming a complex with an Fe ion.

(Aspect 18)

The method for manufacturing a soft magnetic powder according to aspect 17, wherein the water-soluble polymer is at least one selected from the group consisting of polyvinylpyrrolidones, polyvinyl alcohols, hydroxypropyl celluloses, poly(2-methyl-2-oxazoline)s, polyethyleneimines, polyacrylic acids, and carboxymethyl celluloses.

(Aspect 19)

The method for manufacturing a soft magnetic powder according to aspect 17 or aspect 18, wherein the surfactant is at least one selected from the group consisting of polyoxyalkylene styryl phenyl ether sodium phosphate, hexadecyltrimethylammonium bromide, and lauric acid diethanolamide.

(Aspect 20)

The method for manufacturing a soft magnetic powder according to any one of aspects 13 to 19, wherein the metal alkoxide is an alkoxide of at least one selected from the group consisting of Si, Al, Ti, and Zr.

(Aspect 21)

The method for manufacturing a soft magnetic powder according to any one of aspects 13 to 20, wherein the solvent contains alcohol.

(Aspect 22)

A coil component including a magnetic core containing the soft magnetic powder according to any one of aspects 1 to 12 and a resin, and a coil conductor disposed inside an element assembly.

(Aspect 23)

A method for manufacturing a magnetic material including the steps of obtaining a formed article by forming the soft magnetic powder according to any one of aspects 1 to 12, and obtaining a magnetic material by heat-treating the formed article.

While an embodiment of the present disclosure have been described above, just a typical example within the scope of application of the present disclosure has been illustrated. Therefore, it is to be understood by those skilled in the art that the present disclosure is not limited to this and that various modifications can be made.

The soft magnetic powder and the method for manufacturing the same, the coil component containing the soft magnetic powder, and the magnetic material including the soft magnetic powder according to the present disclosure can realize a higher magnetic permeability and higher electrical resistance and, therefore, can be favorably used for wide applications, for example, high-frequency applications.

What is claimed is:

1. A method for manufacturing a soft magnetic powder comprising:

obtaining a slurry by mixing a core containing a soft magnetic metal material, an iron salt, a metal alkoxide, and at least one selected from the group consisting of a water-soluble polymer and a surfactant in a solvent; and obtaining a soft magnetic powder including the core and an insulating film covering the surface of the core by drying the slurry.

2. The method for manufacturing a soft magnetic powder according to claim 1, wherein the obtaining of a slurry includes hydrolyzing the metal alkoxide.

3. The method for manufacturing a soft magnetic powder according to claim 1, wherein the iron salt is soluble in alcohol.

4. The method for manufacturing a soft magnetic powder according to claim 3, wherein the iron salt is at least one selected from the group consisting of iron chloride and iron nitrate and hydrates thereof.

5. The method for manufacturing a soft magnetic powder according to claim 1, wherein the water-soluble polymer and the surfactant have a ligand capable of forming a complex with an Fe ion.

6. The method for manufacturing a soft magnetic powder according to claim 5, wherein the water-soluble polymer is at least one selected from the group consisting of polyvinylpyrrolidone, polyvinyl alcohol, hydroxypropyl cellulose, poly(2-methyl-2-oxazoline), polyethyleneimine, polyacrylic acid, and carboxymethyl cellulose.

7. A method for manufacturing a magnetic material comprising:

obtaining a formed article by forming a soft magnetic powder according to the method of claim 1, the soft magnetic powder comprising a core containing a soft magnetic metal material, and an insulating film covering the surface of the core, wherein the insulating film contains an insulating metal oxide and an iron component, and the iron component includes an iron component embedded in the insulating film; and obtaining a magnetic material by heat-treating the formed article.

* * * * *